United States Patent [19]
Berglund

[11] Patent Number: 6,122,256
[45] Date of Patent: Sep. 19, 2000

[54] FAIL-SAFE COMMUNICATIONS NETWORK FOR USE IN SYSTEM POWER CONTROL

[75] Inventor: Neil Clair Berglund, Kasson, Minn.

[73] Assignee: International Business Machines Corporation, Armonk, N.Y.

[21] Appl. No.: 08/912,561

[22] Filed: Aug. 18, 1997

[51] Int. Cl.[7] .............................. H04L 12/54; G06F 13/00
[52] U.S. Cl. .................... 370/241; 370/392; 370/402; 395/849; 395/200.16
[58] Field of Search .................................... 370/449, 457, 370/401, 522, 252, 249; 395/849, 852, 868, 200.68

[56] References Cited

U.S. PATENT DOCUMENTS

| | | | |
|---|---|---|---|
| 4,271,505 | 6/1981 | Menot et al. .............................. 370/85 |
| 5,117,430 | 5/1992 | Berglund et al. ...................... 370/85.1 |
| 5,566,171 | 10/1996 | Levinson ................................ 370/60.1 |
| 5,666,559 | 9/1997 | Wisor et al. .............................. 395/852 |
| 5,787,256 | 7/1998 | Marik et al. ........................ 395/200.68 |
| 5,790,541 | 8/1998 | Patrick et al. ........................... 370/392 |

Primary Examiner—Huy D. Vu
Assistant Examiner—M. Phan
Attorney, Agent, or Firm—Christopher H. Lynt

[57] ABSTRACT

A communications network includes a primary node and one or more secondary nodes, each node having first and second ports. The primary node periodically polls the network in opposite directions to determine if the network is operating as a loop, or as open chains. The secondary nodes memorize at which port a message is received, and use this information to determine the port at which to output the message, or to output a response message, depending on the type of message received. First and second timers are used depending on whether a successfully received message is a command or a response. If a subsequently received message is garbled, it is stopped from further propagation and an error message sent. The timers are checked and a determination can be made whether the garbled message was a command or a response.

20 Claims, 16 Drawing Sheets

FAIL-SAFE COMMUNICATIONS NETWORK FOR USE IN SYSTEM POWER CONTROL

CROSS REFERENCE TO RELATED PATENT

The subject matter of this application is related to U.S. Pat. No. 5,117,430, which issued May 26, 1992, is assigned to the same assignee as the present application, and which is incorporated herein by reference in its entirety.

BACKGROUND OF THE INVENTION

1. Field of the Invention

The invention relates to the field of computer communications, and more particularly, to providing a fail-safe communications network applicable to, for example, a power control network.

2. Background Information

In previous communications networks, such as the SPCN (System Power Control Network) which is disclosed in U.S. Pat. No. 5,117,430, nodes in the network were connected as two open ended chains of secondary nodes extending from a primary node. The SPCN was designed as a low volume serial network used to monitor power conditions at a plurality of nodes in a computer system, in particular, the IBM AS/400 (IBM and AS/400 are registered trademarks of International Business Machines Corporation). The nodes typically include microprocessors which monitor the status of, and make occasional adjustments to, the power conditions at the respective nodes. However, this prior network arrangement had several limitations.

As can be appreciated, a failure of a secondary node or the cable interconnection between nodes in the network could make all secondary nodes downstream of the failure inaccessible to the system. The network manager would only be able to pinpoint the point of the failure to two adjacent nodes and their interconnection.

Further, there was also a directionality to the connections of the secondary nodes. In particular, the secondary nodes had dedicated input and output ports for receiving and forwarding commands, respectively. The system would not function properly if it was miswired, for example, if a command input port were mistakenly connected to the network as an output port, since the secondary nodes would only accept commands from an input port.

This directionality also presented a problem if it was desired to connect all the nodes of a network in a loop by simply connecting the ends of each chain together. A loop configuration provides two ways to communicate with each node to provide fault tolerance and the ability to more accurately determine the precise location of the failure.

The inability to connect the nodes in a loop configuration also precluded the connection of two or more separate systems into a single configuration since without the loop configuration, it is not possible for the primary nodes of each system to communicate in the event of failures. This prevents one primary node from taking over network management responsibilities from a failing primary node.

Therefore, a need existed for an enhanced communications network to overcome these and other limitations of the prior network systems.

SUMMARY OF THE INVENTION

It is, therefore, a principle object of this invention to provide an enhanced communications network.

It is another object of the invention to provide an enhanced communications network that solves the above mentioned problems.

These and other objects of the present invention are accomplished by the communications network disclosed herein.

According to one aspect of the invention, instead of the open ended chains used in the prior networks, the communications network according to the present invention is wired as a continuous loop. Loop operation allows the system to operate normally even with a failure in the loop.

According to another aspect of the invention, first and second non-directional ports are provided in each of the nodes. These ports operate as either input or output ports for commands, so that the problems caused by wiring errors with the prior directional ports are eliminated.

According to another aspect of the invention, in the secondary nodes, all received messages (commands going outbound, away from the primary node, and responses going inbound, towards the primary node) are processed after memorizing through which of the two ports they were received. Responses addressed to the primary node are returned to the primary node through the same port as the associated command was received. Broadcast commands, and commands not addressed to the node receiving a message, are forwarded to the rest of the network through the "other" port, that is, the other port from the port on which they were received. Responses from other nodes are forwarded to the primary node on the "other" port from the port on which they were received as well.

According to another aspect of the invention, in order to determine whether a garbled message was a command or a response, and to accurately determine the exact location of the cause of the communications failure, message timers are implemented based on message type and destination network address.

During normal operation, if a message is a command and the address is a broadcast address, then a first timer, e.g., 260 milliseconds, is started after the message is successfully received and forwarded to the next node. If the message is a command and the address is a node specific address, that is, the message is addressed to a specific node (not including the receiving node), then a second, different timer, e.g., 1.25 seconds, is started when the message is successfully received and forwarded to the network. Subsequently, when a successful response is received, the first (260 ms) timer, if running, is restarted as other responses to the broadcast command may still be coming. On the other hand, the second (1.25 s) timer, if running when a successful response is received, is stopped since the response is the only response to a node specific command. Therefore, when a garbled message is received, the timers can be inspected to determine whether the message was a command or a response.

If a timer is running, then it is determined that the received garbled message was a response since the primary node would not have sent a new command until after the timers expire because it uses the same values to detect the end of responses for each command sent. If a timer is not running, then it is determined that the received garbled message was a command. In either case, since the direction to the primary node is known, from the type of message and the port on which it was received, an error message can be transmitted to identify the location of the failure and the type of message that was garbled.

Since the port on which the garbled message was received is known, it is also possible to avoid using that port to send the error message to the primary node, or other messages to other nodes, in case that portion of the loop connected to the port in question is inoperative. Therefore, when garbled messages are received at a node, the garbled messages are stopped from further propagation, the location of the failure is determined, a special error message is built by the detecting node which can indicate whether the garbled message was a command or a response, and the error message returned to the primary node through the appropriate port.

According to another aspect of the invention, polling can be used to determine that the network is operating correctly as a loop network. A primary node of the network periodically polls the network in opposite directions to determine if the network is actually operating as a loop, or as open chains. A network manager in the primary node controls the network communication loop operation. Network poll commands are alternately sent out through each port of the primary node. If the first byte of the network poll command is received through the opposite port from the port through which the poll command was sent, having traveled completely around the loop, a flag is set in the primary node. Interrupts are turned off for this opposite port after the first byte of the poll has been received to conserve processing power, since no value is added by receiving the complete poll after it has traveled the loop. Further, if polls successfully arrive through both ports after polling is performed in both the forward and the reverse directions, respectively, then the network is determined to be operating in loop mode. This polling in both directions detects any fault in the loop that affects only one direction. If polls do not successfully complete the loop from both directions, the network is determined to be operating as open chains.

According to another aspect of the invention, when the network has been determined to be operating in loop mode, the network is thereafter polled alternately in opposite directions. All the network status data can be collected by a single poll that completes the loop. Consequently it is not necessary to poll in both directions on every poll cycle. Alternating polling directions provides additional assurance that the network continues to be fully operational as a loop.

According to another aspect of the invention, the network manager maintains a configuration table which is available to the operating system. The entries in the table can be maintained in the actual physical order of the nodes in the network so that the actual network address assignment operates simply and easily. When polling is performed in the reverse direction, the configuration table need not be re-ordered, but is simply searched in the reverse direction.

According to another aspect of the invention, when the network is operating as open chains, both chains are polled on every cycle to collect current status information from each of the nodes. This takes slightly longer than polling all nodes in a loop mode. In this case, the configuration table can be re-ordered to match the physical order of nodes based on returned responses through the first port, followed by the second port, when the network loop is open.

To minimize complexity in network management, address assignment and all commands from the operating system can be directed in only one direction when the network is operating as a loop, i.e., the "forward" direction.

Because of the lack of directional ports, two or more networks can be easily reconfigured as a clustered system without regard for command input and output directionality. This increases reliability and ease of use of the system, and provides the ability to control multiple clustered systems as if they were a single system for the purposes of power control and monitoring.

BRIEF DESCRIPTION OF THE DRAWINGS

FIGS. 7B-1, 7B-2 and 7B-3 illustrate the operation of a primary node control program.

DETAILED DESCRIPTION OF THE PREFERRED EMBODIMENTS

The invention will now be described in more detail by way of example with reference to the embodiments shown in the accompanying figures. It should be kept in mind that the following described embodiments are presented only by way of example, and should not be construed as limiting the inventive concept to any particular physical configuration.

In an exemplary embodiment of the invention, the communications network is a low volume serial network used to monitor power conditions at a plurality of nodes in a computer system. The nodes typically include microprocessors which monitor the status of, and make occasional adjustments to, the power conditions at the respective nodes. However, it should be understood that the present invention may have other applications and is not intended to be limited to this exemplary embodiment. The exemplary system illustrated and described herein is one implementation of the invention applied to an IBM AS/400 computer system, it being understood that other systems could be used in accordance with the spirit of the invention. The terms "loop" and "wrap" may be used interchangeably herein.

As mentioned above, according to one aspect of the invention, instead of the open ended chains used in the prior networks, the communications network according to the present invention is wired as a continuous loop. Loop operation allows the system to operate normally even with a failure in the loop.

Figure 1:
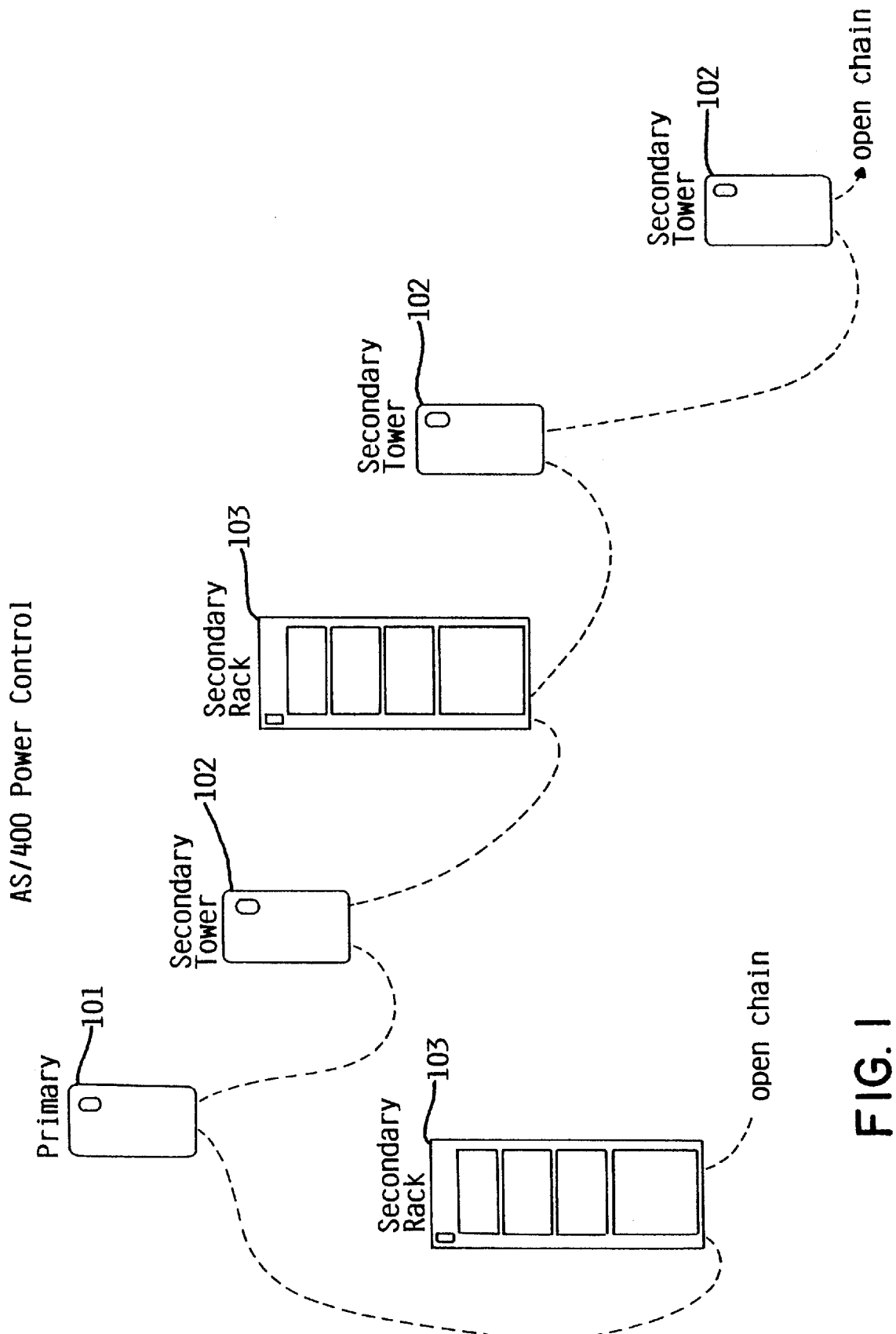
FIG. 1 illustrates an IBM AS/400 system power control network connected as open chains.

FIG. 1 illustrates a network of open chains of racks 103 and towers 101, 102. For the purposes of simplifying this description, node processors in both racks and towers will be referred to as the network nodes, either the primary node or a secondary node of the network. However, it is understood that within the racks and towers, there may be one or more processing devices, and any of these could be functioning as the network node depending on the particular processing requirements.

Briefly, a tower is a small rack typically containing a tower node processor and only one slave processor, while a rack typically contains a rack node processor and several slave processors. The primary rack or tower of the network also contains a central electronics complex (CEC) with the network "master" processor, as well as the computer system CPU. In an exemplary embodiment, the rack node processors and tower node processors function as, and are interchangeably referred to as, the network nodes.

Figure 2:
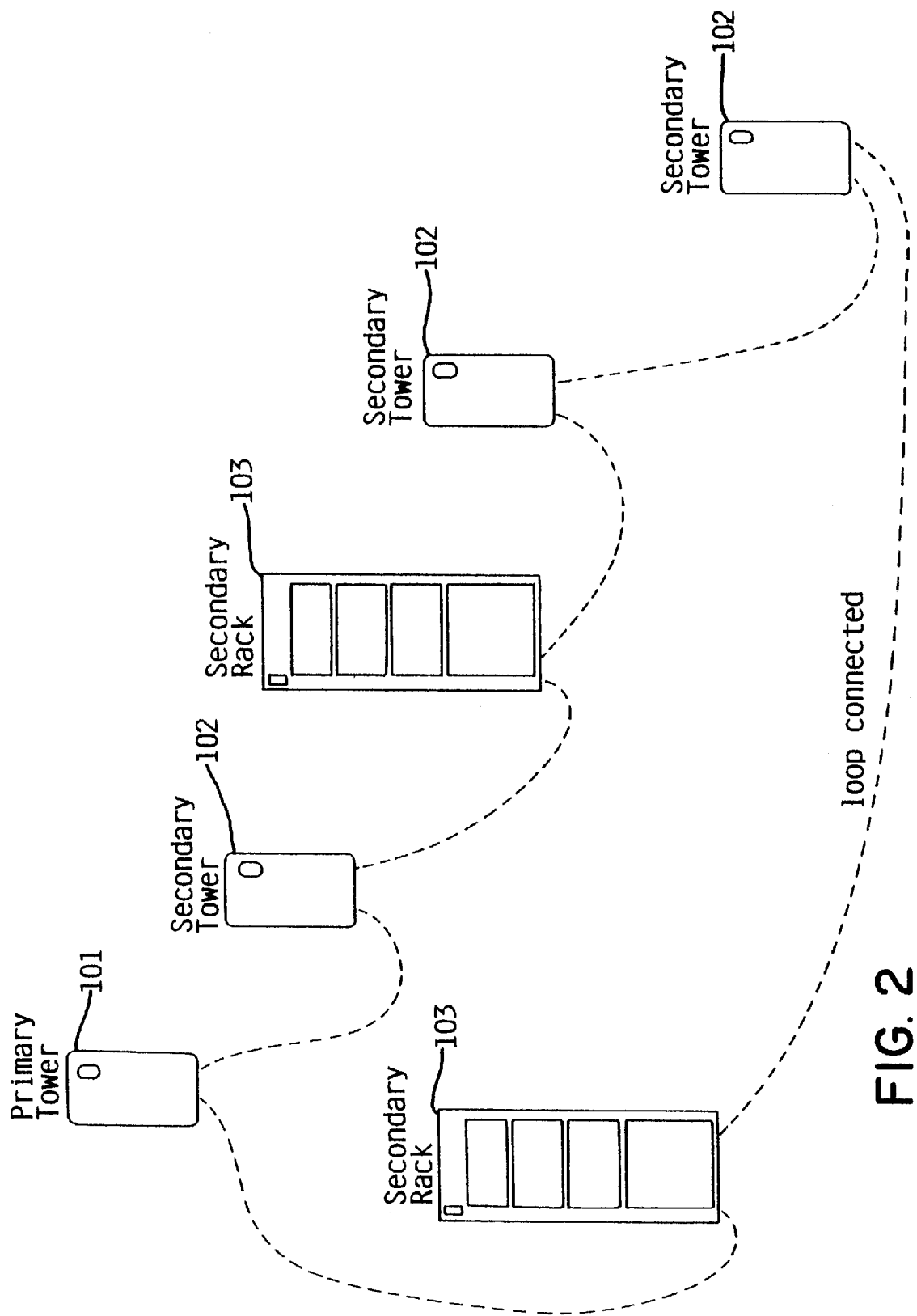
FIG. 2 illustrates an IBM AS/400 system power control network connected as a closed loop.

As illustrated in FIG. 2, a network according to an exemplary embodiment of the present invention is wired to form a loop network of racks 103 and/or towers 102, one of the racks/towers being the "primary" 101 containing the system processor and a processor functioning as the master of the network. The network master processor and the node processor may well be one and the same device, but they could also be separate devices. The tower or rack designated as the primary tower or rack 101, is so designated because it contains the master node which controls the network.

As mentioned above, according to one aspect of the invention, first and second non-directional ports are provided in each of the nodes. These ports operate as either input or output ports for commands, so that the problems caused by wiring errors with the prior directional ports are eliminated.

Figure 3:
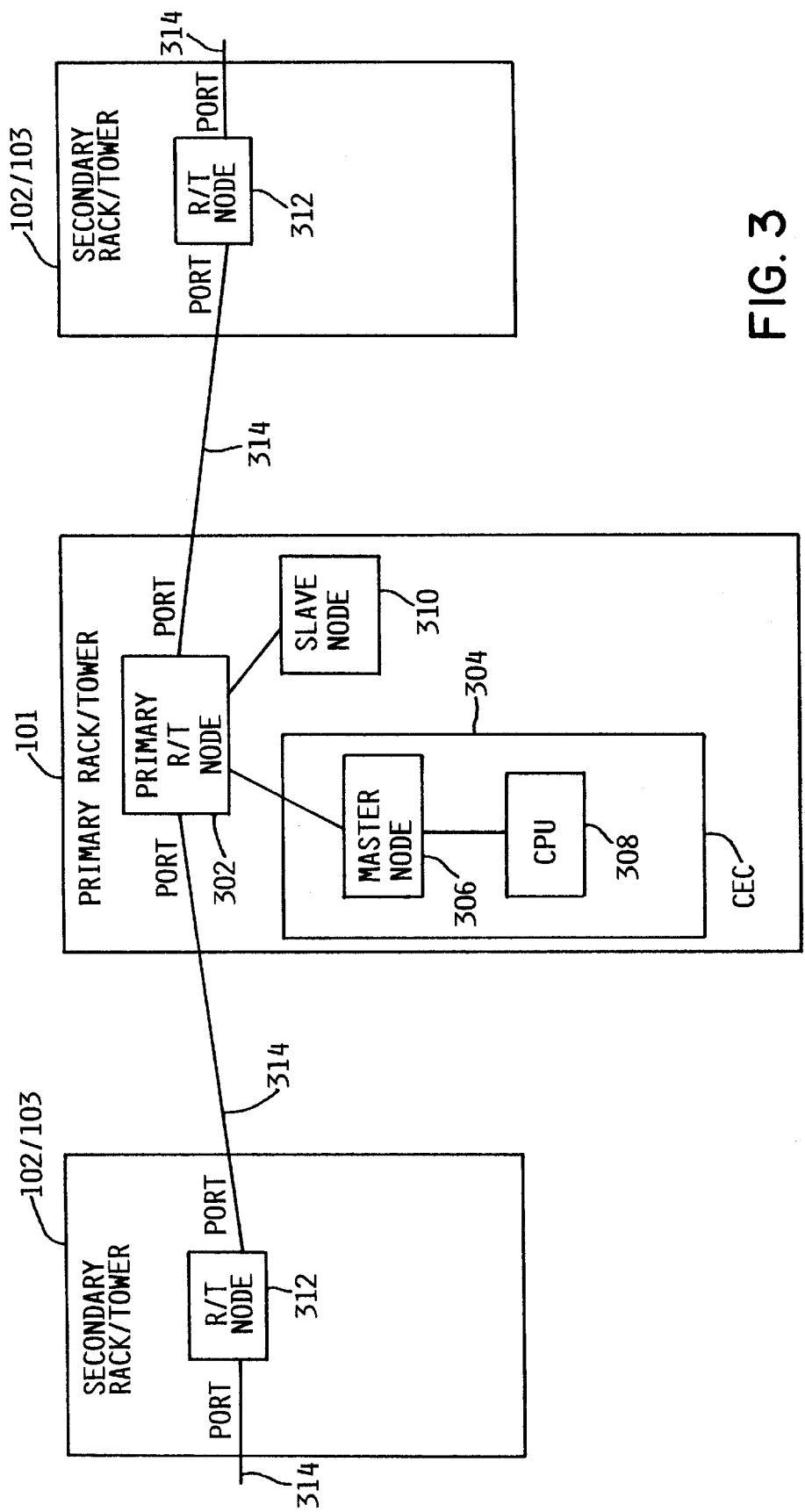
FIG. 3 illustrates a primary rack/tower coupled to a secondary rack/tower at each port in a power control network.
Figure 4A:
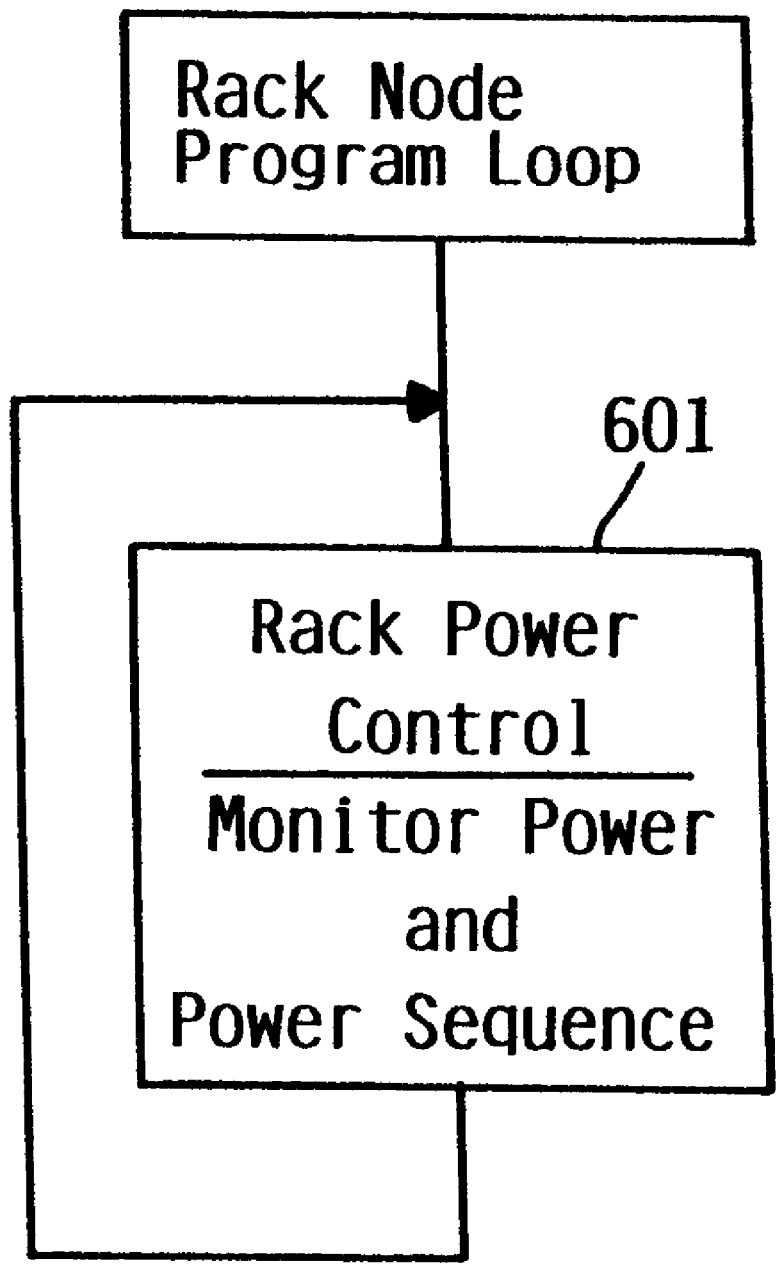
FIG. 4 is a flow chart of a rack/tower node control program.
Figure 4B:
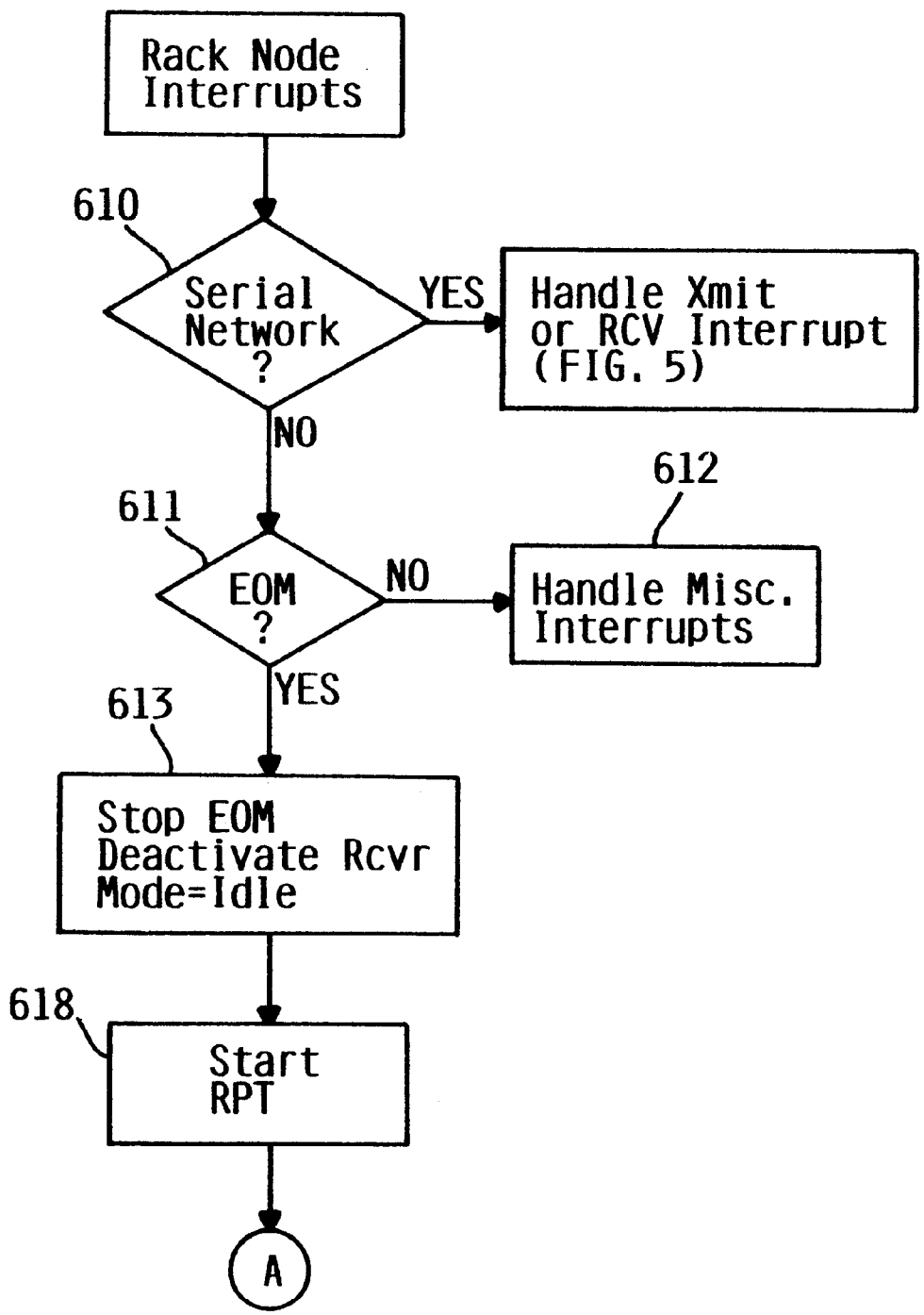
Figure 4C:
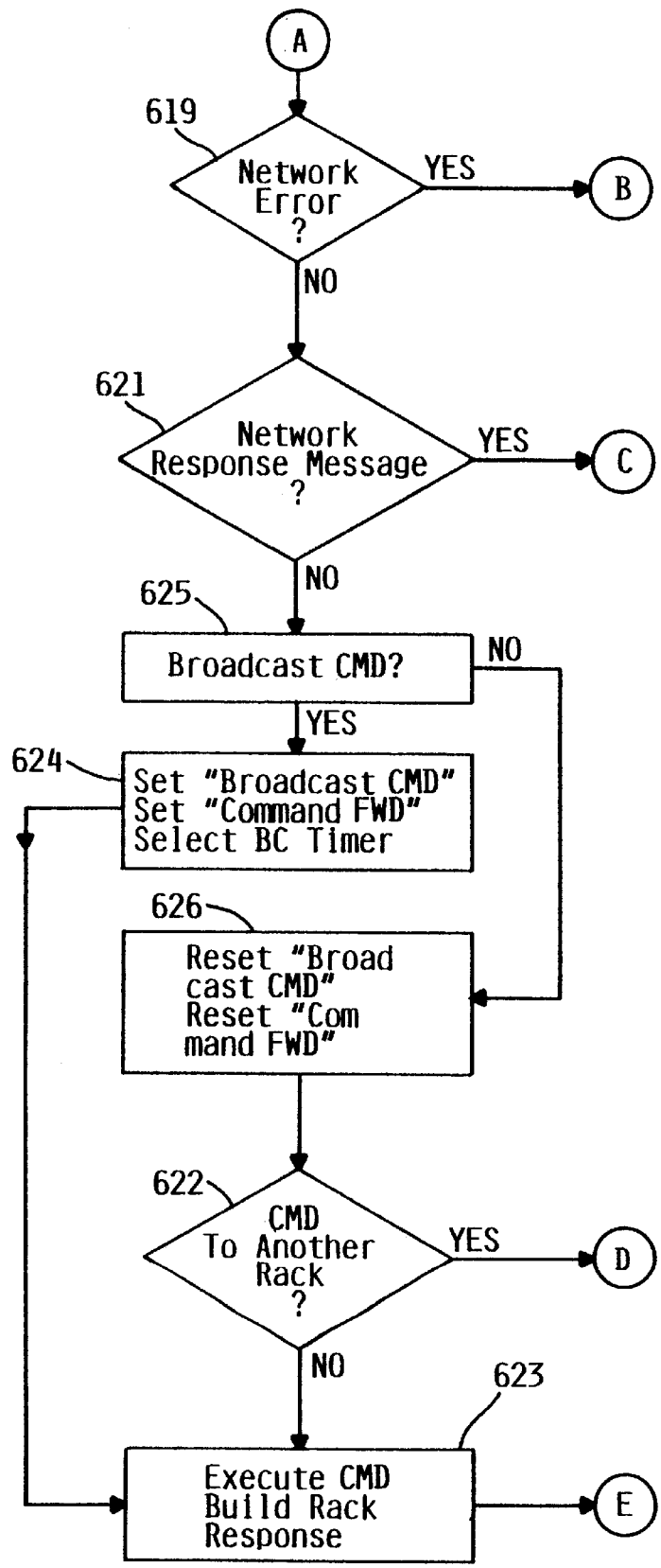
Figure 4D:
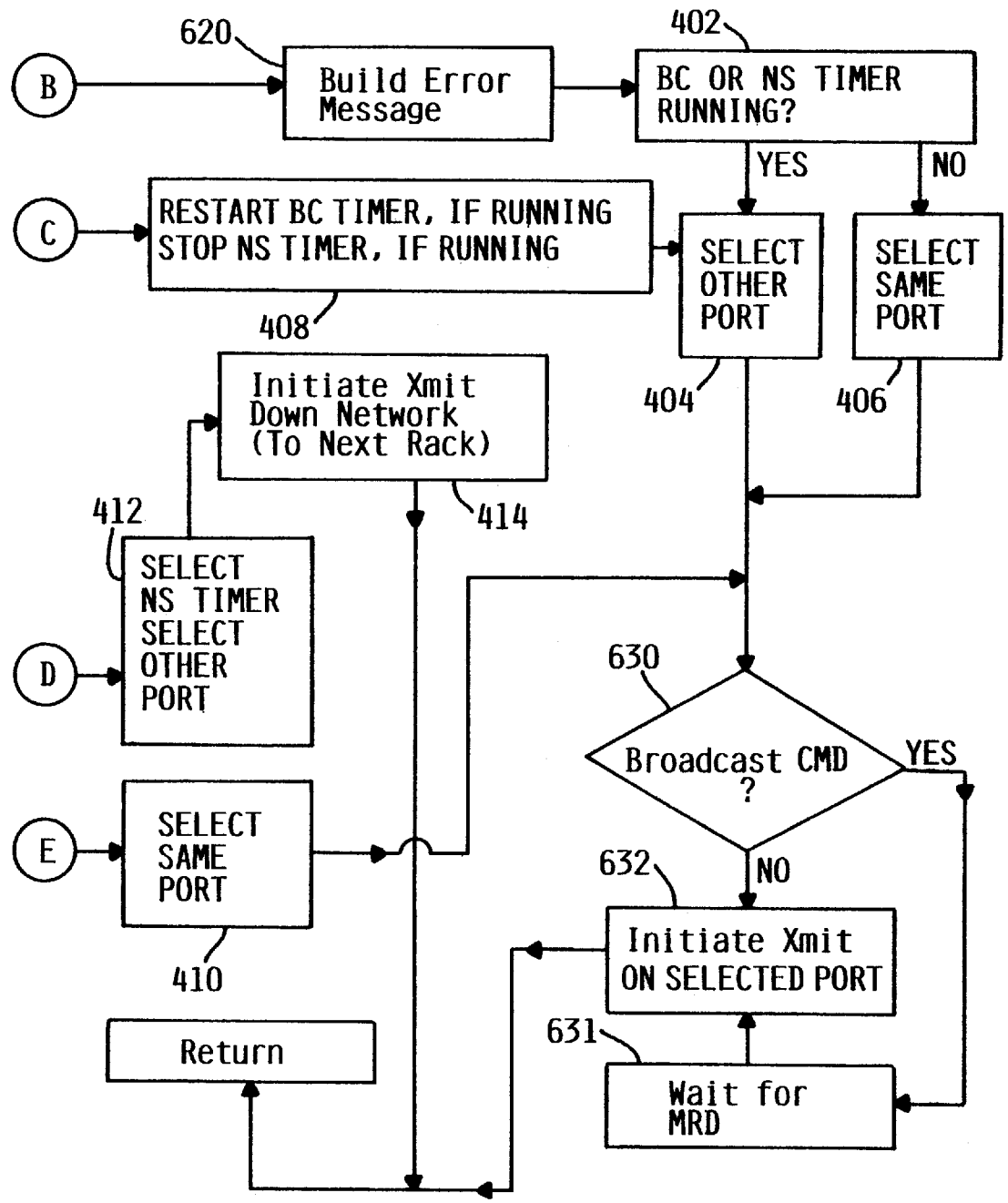

In the exemplary embodiment illustrated in FIG. 3, the primary rack/tower 101 includes a primary rack/tower (R/T) node processor 302, with first and second ports, and includes the central electronics complex (CEC) 304. The CEC 304 illustrated contains the master node processor 306 and system CPU 308. The primary rack/tower 101 may also contain one or more slave node processors 310. Two secondary rack/towers 102/103 are shown, each having therein a rack/tower (R/T) node processor 312. Other internal details of the primary 101 and secondary rack/towers 102/103 are not shown since these are not necessary to understand the present invention. A typical rack system is disclosed in the prior U.S. Pat. No. 5,117,430.

The first and second ports of the primary rack/tower node processor 302 are connected to the communications medium 314, which is also connected to ports of the secondary node processors 312 in a series arrangement to form a loop from the first port of the primary rack/tower node processor 302 to the second port of the primary rack/tower node processor 302, as can also be seen from FIG. 2. The ports of each node are designated as port 0 and port 1, port 0 of the primary node being by convention connected to the network in the forward direction.

As mentioned above, according to one aspect of the invention, in the secondary nodes, all received messages (commands going outbound, away from the primary node, and responses going inbound, towards the primary node) are processed after memorizing through which of the two ports they were received. Responses addressed to the primary node are returned to the primary node through the same port as the associated command was received. Broadcast commands, and commands not addressed to the node receiving a message, are forwarded to the rest of the network through the "other" port, that is, the other port from the port on which they were received.

Responses from other nodes are forwarded to the primary node on the "other" port from the port on which they were received as well.

FIG. 4 illustrates a flow chart of a rack/tower node control program according to an exemplary embodiment of the invention. A rack node program loop includes rack power control routine 601 for monitoring power at the local rack/tower node. An interrupt handler, steps 610–632, determines the type of interrupt and the processing for handling the interrupt. For the purposes of describing the present invention as it relates to a network error, only the steps beginning with step 619 are of interest. For a detailed description of the processing steps not expressly discussed herein, reference is made to the prior U.S. Pat. No. 5,117,430.

As mentioned above, according to one aspect of the invention, in order to determine whether a garbled message was a command or a response, and to accurately determine the exact location of the cause of the communications failure, message timers are implemented based on message type and destination network address.

During normal operation, if a message is a command and the address is a broadcast address, then a first timer, e.g., 260 milliseconds, is started after the message is successfully received and forwarded to the next node. If the message is a command and the address is a node specific address, that is, the message is addressed to a specific node (not including the receiving node), then a second, different timer, e.g., 1.25 seconds, is started when the message is successfully received and forwarded to the network. Subsequently, when a successful response is received, the first (260 ms) timer, if running, is restarted as other responses to the broadcast command may still be coming. On the other hand, the second (1.25 s) timer, if running when a successful response is received, is stopped since the response is the only response to a node specific command.

Therefore, when a garbled message is received, the timers can be inspected to determine whether the message was a command or a response. If a timer is running, then it is determined that the received garbled message was a response since the primary node would not have sent a new command until after the timers expire because it uses the same values to detect the end of responses for each command sent. If a timer is not running, then it is determined that the received garbled message was a command. In either case, since the direction to the primary node is known, from the type of message and the port on which it was received, an error message can be transmitted to identify the location of the failure and the type of message that was garbled.

Since the port on which the garbled message was received is known, it is also possible to avoid using that port to send the error message to the primary node, or other messages to other nodes, in case that portion of the loop connected to the port in question is inoperative. Therefore, when garbled messages are received at a node, the garbled messages are stopped from further propagation, the location of the failure is determined, a special error message is built by the detecting node which can indicate whether the garbled message was a command or a response, and the error message returned to the primary node through the appropriate port.

In step 619, a received message is checked for errors, and if an error is detected, an error message is built in step 620. Then the broadcast (BC) timer and the node specific (NS) timer are checked in step 402 to determine if either is running. If either timer is running (YES), indicating the message with an error was a response, then the "other" port, i.e., the port other than the port on which the message was received, is selected in step 404. If a timer is not running (NO), indicating the message with an error was a command, then the port on which the message was received, i.e., the "same" port, is selected in step 406.

If on the other hand, no error in the message is detected in step 619, then the message is checked in step 621 to see if it is a response from another rack/tower. If the message is a response, the broadcast (BC) timer is restarted, if running, and the node specific (NS) timer is stopped, if running, in step 408. Then the "other" port, other than the port through which the message was received, is selected in step 404.

If step 621 determines the message is not a response message, the flow proceeds to step 625 test whether the received message is a broadcast command. If YES, then flags are set to indicate "Broadcast Command" and "Command Forward" in step 624. In addition, BC timer is selected to be started after the received command has been forwarded to the network. Since a broadcast command is addressed to every node, the flow proceeds to step 623 to execute the command and build the receiving rack/tower's response to send back to the primary node 101. The same port through which the message was received is selected in step 410 for this purpose.

Next, in step 630, it is decided whether the message is a broadcast command, and if not, then a message is transmitted in step 632 through the port already selected in a previous step (404, 406 or 410). If the message is a broadcast command as determined in step 630, then the node waits for the minimum response delay (MRD) timer to expire in step 631 before transmitting through the previously selected port in step 632.

If the received command is not a broadcast command, NO in step 625, then the flow proceeds to step 626 to reset the flags Broadcast Command and Command Forward. Since the command is not broadcast, it is node specific by default, and flow proceeds to step 622 to determine if the command is addressed to the receiving rack/tower or to another rack/tower farther outbound on the network. If the command is addressed to the receiving rack/tower, flow proceeds to step 623 to execute the command and build a response as already described. If the command is not addressed to the receiving rack/tower, then the command must be forwarded out on the network. Flow proceeds to step 412 to select the "other port" and to select the NS timer to be started when the command forward is complete. In step 414, the first byte of the command forward is initiated.

FIG. 4 shows one way of implementing a message handling process according to an exemplary embodiment of the invention. A skilled programmer in the art would have no trouble writing suitable program instructions implementing this process, and therefore, providing such program instructions here in this description is considered to be unnecessary.

Figure 5A:
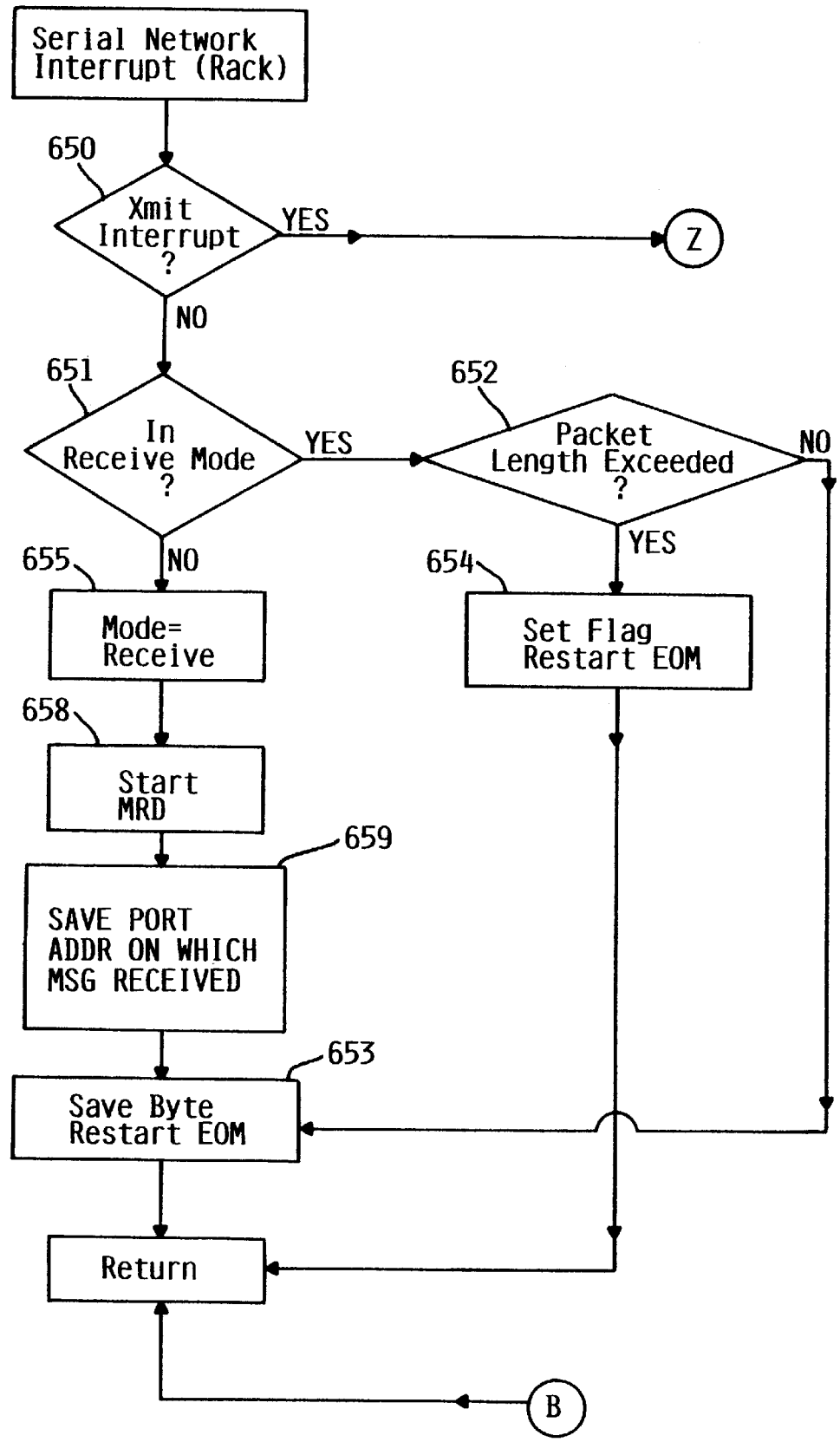
FIG. 5 is a flow chart of the serial network interrupt branch of the rack/tower node control program of FIG. 4.
Figure 5B:
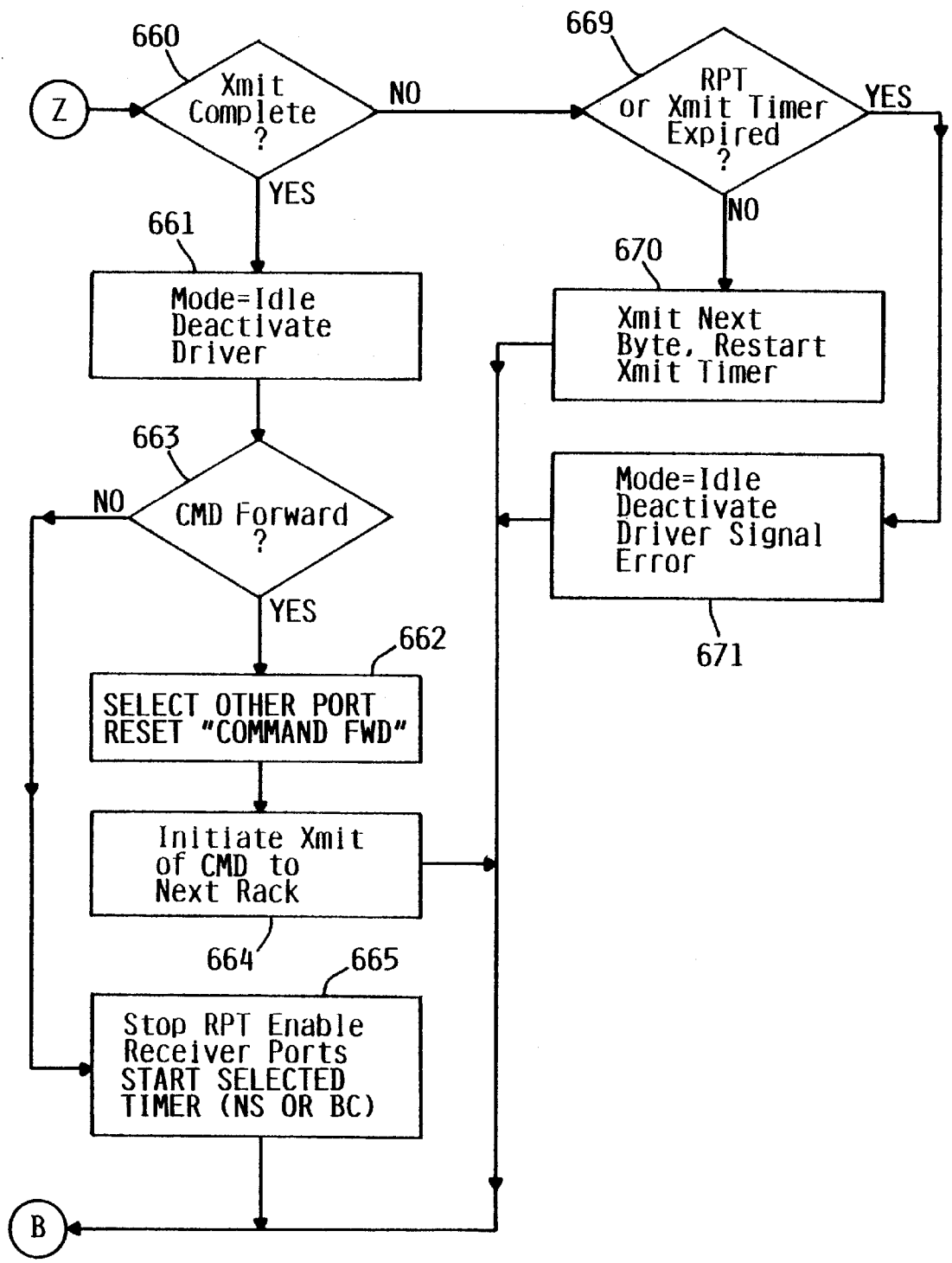

When step 610 in FIG. 4 determines that the type of interrupt is a serial network interrupt, the flow branches to the flow chart illustrated in FIG. 5, which will next be described. Step 650 checks to determine whether the interrupt is a transmit interrupt, and if not, the flow proceeds to step 651 to determine whether the node is in the receive mode.

If the node is not already in the receive mode, the node is placed in the receive mode in step 655, and the MRD is started in step 658. Next, the port through which the message was received is memorized in step 659, and in step 653, the message byte is saved and the end of message (EOM) timer restarted.

If the node was already in the receive mode in step 651, then a packet length error is checked in step 652, and if such an error is found, a flag is set and the EOM timer is restarted in step 654. If no such error is found, the flow branches to step 653 which has already been described.

If step 650 determines the interrupt is a transmit interrupt, the flow proceeds to step 660 to check whether transmission is complete, and if so, the routine sets the node to an idle state and deactivates the serial driver in step 661. In step 663, it is determined whether the transmission was a response to a broadcast command thereby requiring the command to be forwarded to the rest of the network. If YES, then the "other" port is selected in step 662, and the flow proceeds to step 664 to reset the Command Forward flag and to transmit the command to the next rack/tower in the network. If the Command Forward flag was not set in step 663, then the flow proceeds to step 665 to complete this node's processing of this message. The rack process timer (RPT) is stopped, the receiver ports are enabled to receive the next message, and the selected timer, NS or BC is started.

If step 660 determines that the transmission is not complete, the flow proceeds to step 669 where it is determined whether the RPT or the transmit timer have expired. If neither have expired, then the next byte is transmitted and the transmit timer is restarted in step 670. If either timer has expired, the flow proceeds to step 671 where the node is placed in the idle mode and the serial driver is deactivated to abort the transmission.

As mentioned above, according to one aspect of the invention, polling can be used to determine that the network is operating correctly as a loop network. A primary node of the network periodically polls the network in opposite directions to determine if the network is actually operating as a loop, or as open chains. A network manager in the primary node controls the network communication loop operation. Network poll commands are alternately sent out through each port of the primary node. If the first byte of the network poll command is received through the opposite port from the port through which the poll command was sent, having traveled completely around the loop, a flag is set in the primary node. Interrupts are turned off for this opposite port after the first byte of the poll has been received to conserve processing power, since no value is added by receiving the complete poll after it has traveled the loop. Further, if polls successfully arrive through both ports after polling is performed in both the forward and the reverse directions, respectively, then the network is determined to be operating in loop mode. This polling in both directions detects any fault in the loop that affects only one direction. If polls do not successfully complete the loop from both directions, the network is determined to be operating as open chains.

When the network has been determined to be operating in loop mode, the network is thereafter polled alternately in opposite directions. All the network status data can be collected by a single poll that completes the loop. Consequently it is not necessary to poll in both directions on every poll cycle. Alternating polling directions provides additional assurance that the network continues to be fully operational as a loop.

Loop operation is controlled from the primary node 101. A network manager program running on a processor in the primary node 101 controls the communication loop operation. Network polling command messages are alternately sent out each port of the primary node 101. If the first byte of the poll is received on the opposite port, having traveled completely around the network loop, a flag is set in the primary node 101. Interrupts are turned off on the alternate port after the first byte of the poll has been received to conserve processing power, since no value is added by receiving the complete poll after it has traveled the network loop. Further, if polls successfully arrive at both ports of the primary node 101 after polling in forward and reverse directions, respectively, then the network is determined to be operating in loop mode (see FIG. 2). However, if polls do not successfully complete the loop from both directions back to the primary node 101, the network is determined to be operating as open chains (see FIG. 1).

When the network has been determined to be operating in loop mode, the network is thereafter polled by the primary node 101 alternately in opposite directions. This detects any fault in the loop that only affects one direction of communication. All the network status data maintained in the primary node 101 can be collected by a single poll that completes the network loop, consequently it is not necessary to poll in both directions during every poll cycle.

Figure 6:
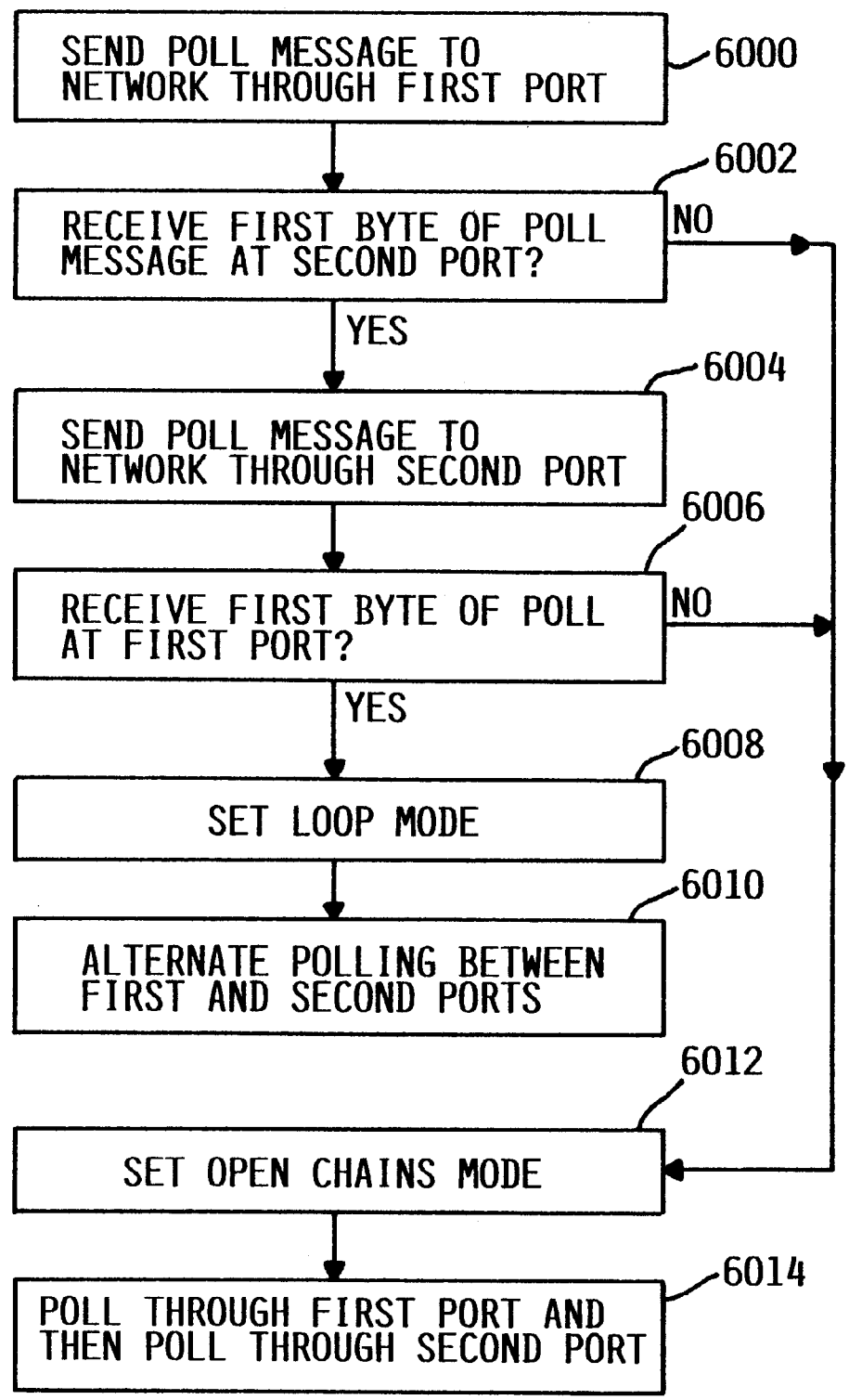
FIG. 6 is a flow chart of a polling routine according to an aspect of the invention.

An example of this polling operation is shown in FIG. 6. In step 6000, a poll message is sent from the primary node 101 through a first port thereof to the rest of the network, and if the first byte of the message is successfully received at the second port of the primary node 101 as determined in step 6002, then the polling message is sent through the network in the other direction, through the second port of the primary node 101 in step 6004. If this polling message is successfully received at the first port of the primary node 101 as determined in step 6006, then the primary node 101 has verified that the network is operating in loop mode, and in subsequent polls, the network, set in loop mode in step 6008, is polled alternately in one direction or the other through the respective first or second port of the primary node 101 as indicated in step 6010. If however, the polling messages do not successfully travel in both directions around the network, then the network is set in the open chains mode in step 6012, and polling in each subsequent polling cycle is done through both ports as indicated in step 6014.

Further, when the network is operating in loop mode, by alternate polling in one direction and then in the other, the network manager can verify that the network loop is operating correctly. In other words, the primary node, by periodically polling the network in opposite directions, can determine whether the network is actually operating as a loop, or is operating as open chains.

As mentioned above, according to one aspect of the invention, the network manager resident in the primary node maintains the network configuration table (not shown), and this table is available to the computer operating system. The entries in the table can be maintained by the network manager in the actual physical order of the nodes in the network so that the actual network address assignment operates easily. When polling in the reverse direction is undertaken, the configuration table need not be reordered, but can simply be searched in the reverse direction.

However, the invention is not limited to this particular arrangement of the configuration table. One skilled in the art would realize that there may be cases where a particular arrangement of the configuration table other than in the actual physical order of the nodes may result in an optimum performance due to the actual network characteristics.

Where two or more loop networks are subsequently connected together to form a clustered system with multiple central electronics complexes, i.e., primary nodes, one of the primary nodes would be made subserviant to the other primary so that there is only one master of the newly formed network. In such a case, however, there could be a number of different ways of handling polling in the new network. The new network could simply be polled as a contiguous loop in the manner already described.

On the other hand, alternate ways could be envisioned. For example, assuming the two loops were connected by simply coupling the two primary nodes together, the former primary node of the added loop could be polled by the master of the new network, and in response, the former primary node could conduct a poll of the nodes in its sub-loop, reporting to the master primary node of the newly formed network on the status of these nodes. The master node could store the node information as a configuration table which has a sub-table for the added loop. If the added loop is operating as open chains, the first loop could still operate in loop mode, but the sub-table of the configuration table would be in the form used for open chains.

As mentioned above, according to one aspect of the invention, when the network is operating as open chains, both chains are polled on every cycle to collect current status information from each of the nodes. This takes slightly longer than polling all nodes in a loop mode. In this case, the configuration table can be re-ordered to match the physical order of nodes based on returned responses through the first port, followed by the second port, when the network loop is open.

To minimize complexity in network management, address assignment and all commands from the operating system can be directed in only one direction when the network is operating as a loop, i.e., the "forward" direction.

Because of the lack of directional ports, two or more networks can be easily reconfigured as a clustered system without regard for command input and output directionality. This increases reliability and ease of use of the system, and provides the ability to control multiple clustered systems as if they were a single system for the purposes of power control and monitoring.

However, the above is only one way of maintaining the configuration table, and one skilled in the art would realize that other ways could be used within the spirit of the invention.

Figure 7A:
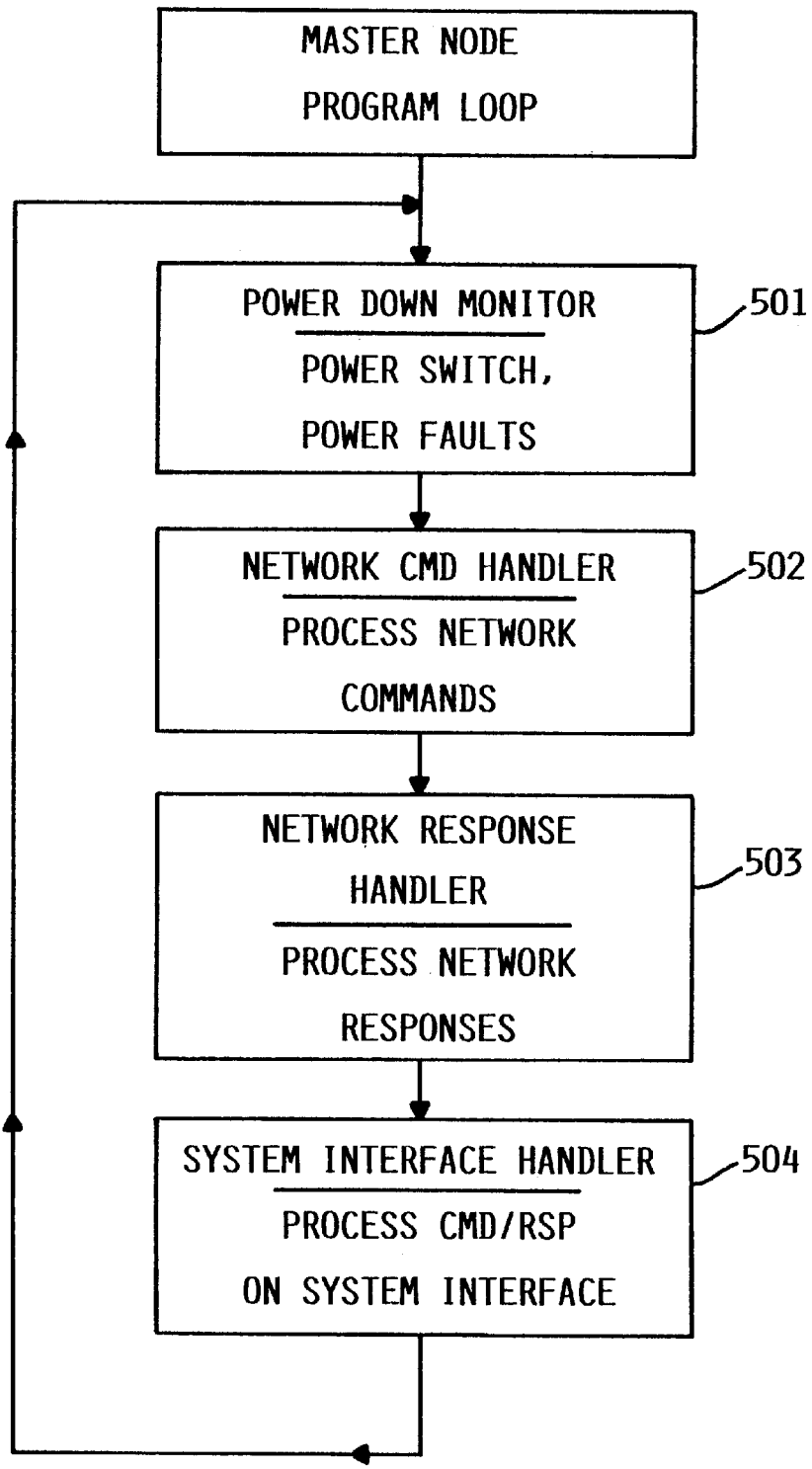
Figures 1, 7B:
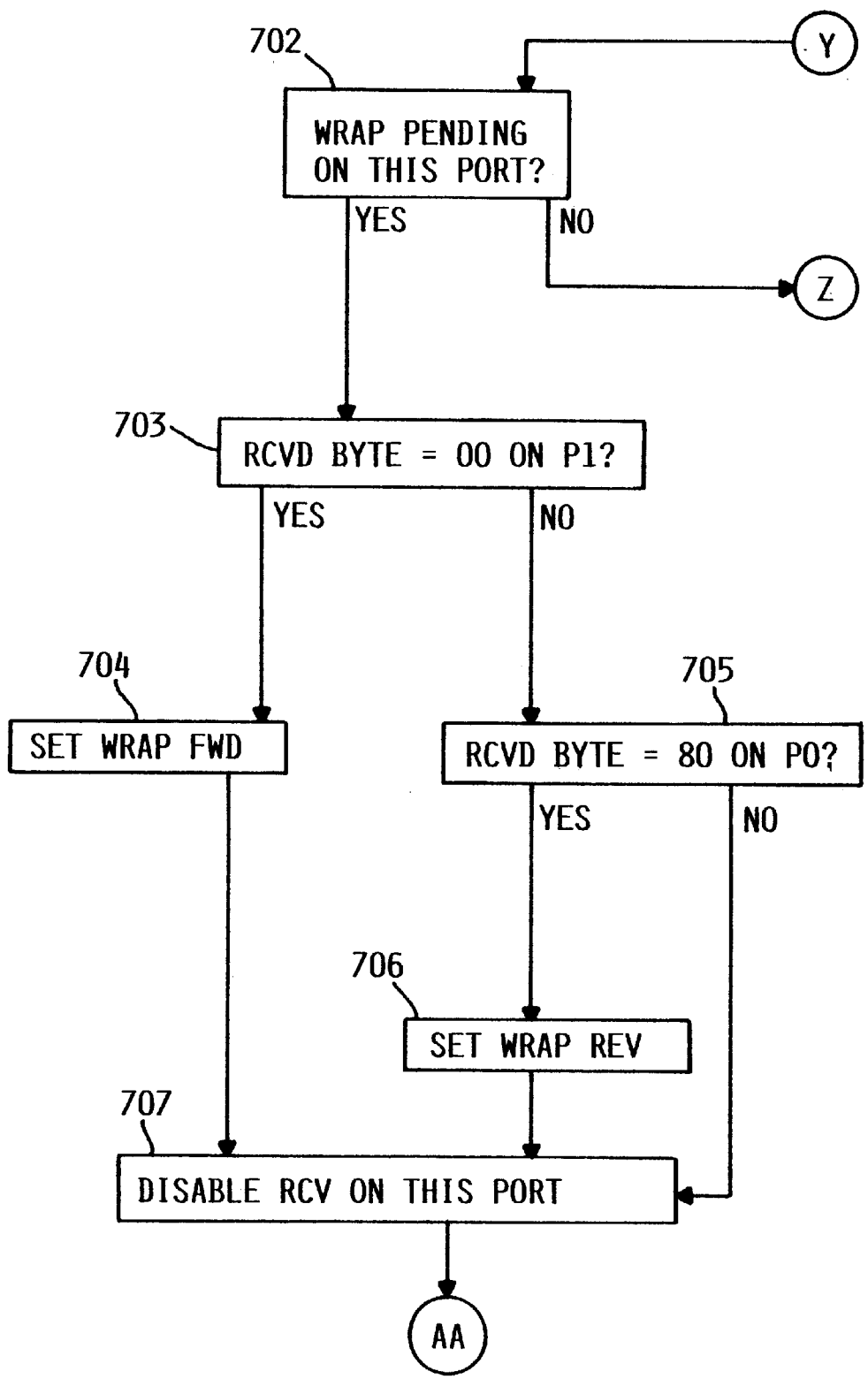
Figures 2, 7B:
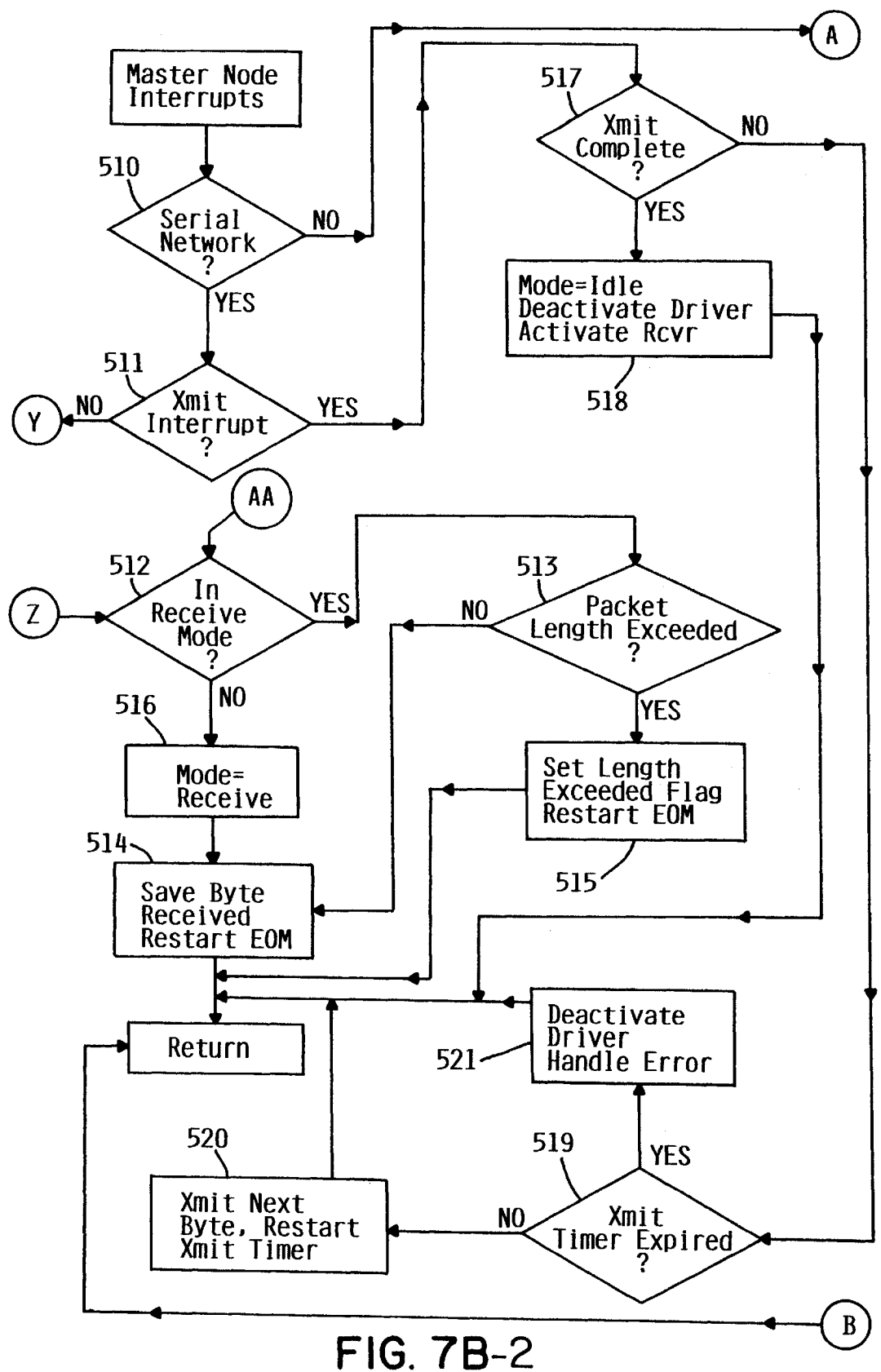
Figures 3, 7B:
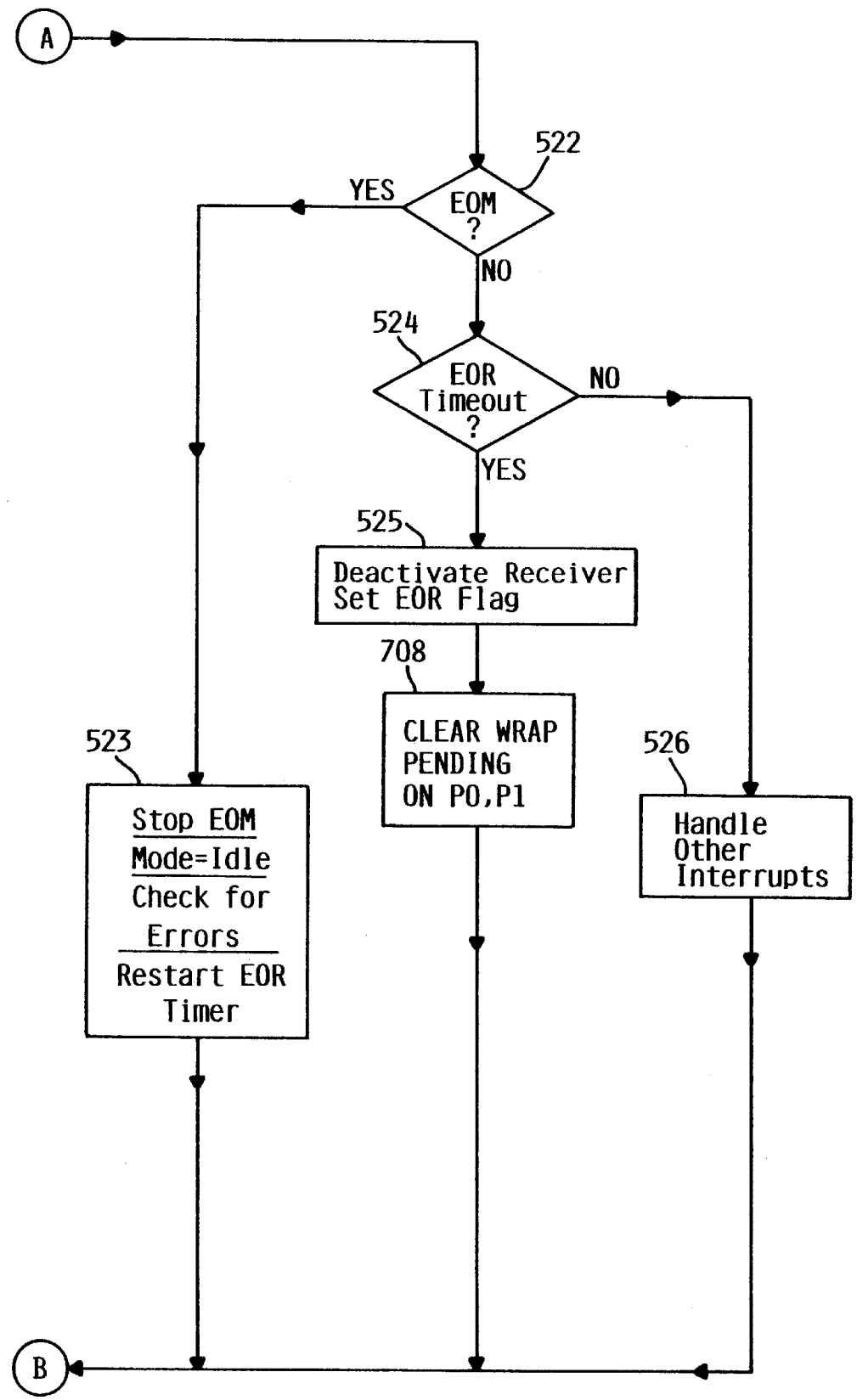

FIGS. 7A, 7B and 7B2 illustrate the operation of an embodiment of a primary node master control program running in the primary node. The operations in the program loop include power down monitor 501, network command handler 502, network response handler 503, and system interface handler 504. The network command handler 502 handles the processing of commands going to the network. The network response handler 503 processes responses received from the network. The loop can be interrupted by a number of different interrupts, and the interrupt handler is shown in FIG. 7B.

Turning now to FIG. 7B, if an interrupt is a serial network interrupt, generated when a byte has been received or transmitted by the serial network circuitry as determined in step 510, the flow proceeds to determine whether it is a transmit or a receive interrupt in step 511. If the interrupt is not a transmit interrupt, the flow branches to step 702 where it is determined whether a wrap is pending on the current port. If a wrap is not pending, the flow proceeds to step 512. If a wrap is pending as determined in step 702, then the flow proceeds to step 703 where it is determined if received byte equals 00 on port P1. If the determination is YES, the flow proceeds to step 704 to set the wrap forward flag, and then the flow proceeds to the disable receive on this port step 707. If the determination in step 703 is NO, then the flow proceeds to step 705 where it is determined if received byte equals 80 on port P0. If the determination is YES, the flow proceeds to step 706 to set the wrap reverse flag, and then the flow proceeds to the disable receive on this port step 707. If the determination in step 705 is NO, then the flow proceeds directly to the disable receive on this port step 707. After step 707, the flow proceeds to step 512 to determine if the node is in the receive mode. The rest of the routine illustrated in the figure is the same as in FIG. 5B of the prior U.S. Pat. No. 5,117,430, and is described therein, therefore, it will not be described here in the interests of efficiency.

If in step 510 illustrated in FIG. 7B, it is determined that there is not a serial network interrupt, then the flow proceeds to "A" which is illustrated in FIG. 7B2, to check for other types of interrupts. In step 522 of FIG. 7B2, the end of message (EOM) timer is checked for a time out, and if a time out has occurred, the flow proceeds to step 523 to stop the EOM timer, set the mode to idle, check for errors, and to restart the end of response (EOR) timer.

If the EOM timer did not time out as determined in step 522, the flow proceeds to step 524 to check the end of response (EOR) timer for a timeout. If the EOR timer did not time out, then the flow proceeds to step 526 to handle other interrupts. If the EOR timer did time out, as determined in step 524, the flow proceeds to step 525 to deactivate the receiver and set an EOR flag, and to step 708 to clear the wrap pending flags on ports P0 and P1. The EOR flag is tested by the network response handler 503 to determine when all network responses have been received so that response processing can be initiated. The flow returns from FIG. 7B2 to FIG. 7B at "B." All interrupts return control to the control program loop of FIG. 7A.

Figure 8A:
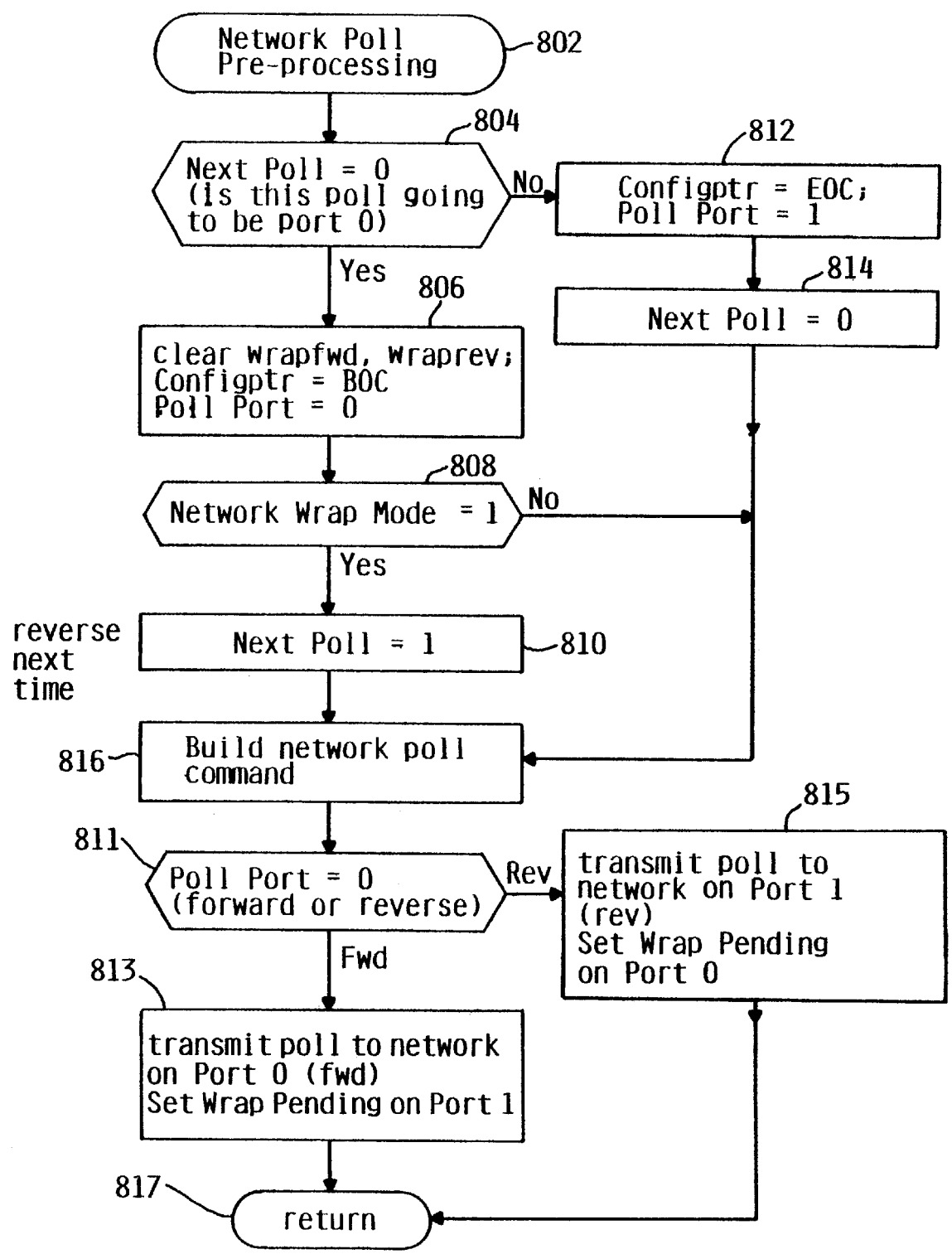
FIGS. 8A and 8B illustrate details relating to polling and loop testing, respectively, of steps 502 and 503, respectively, of FIG. 7A.
Figure 8B:
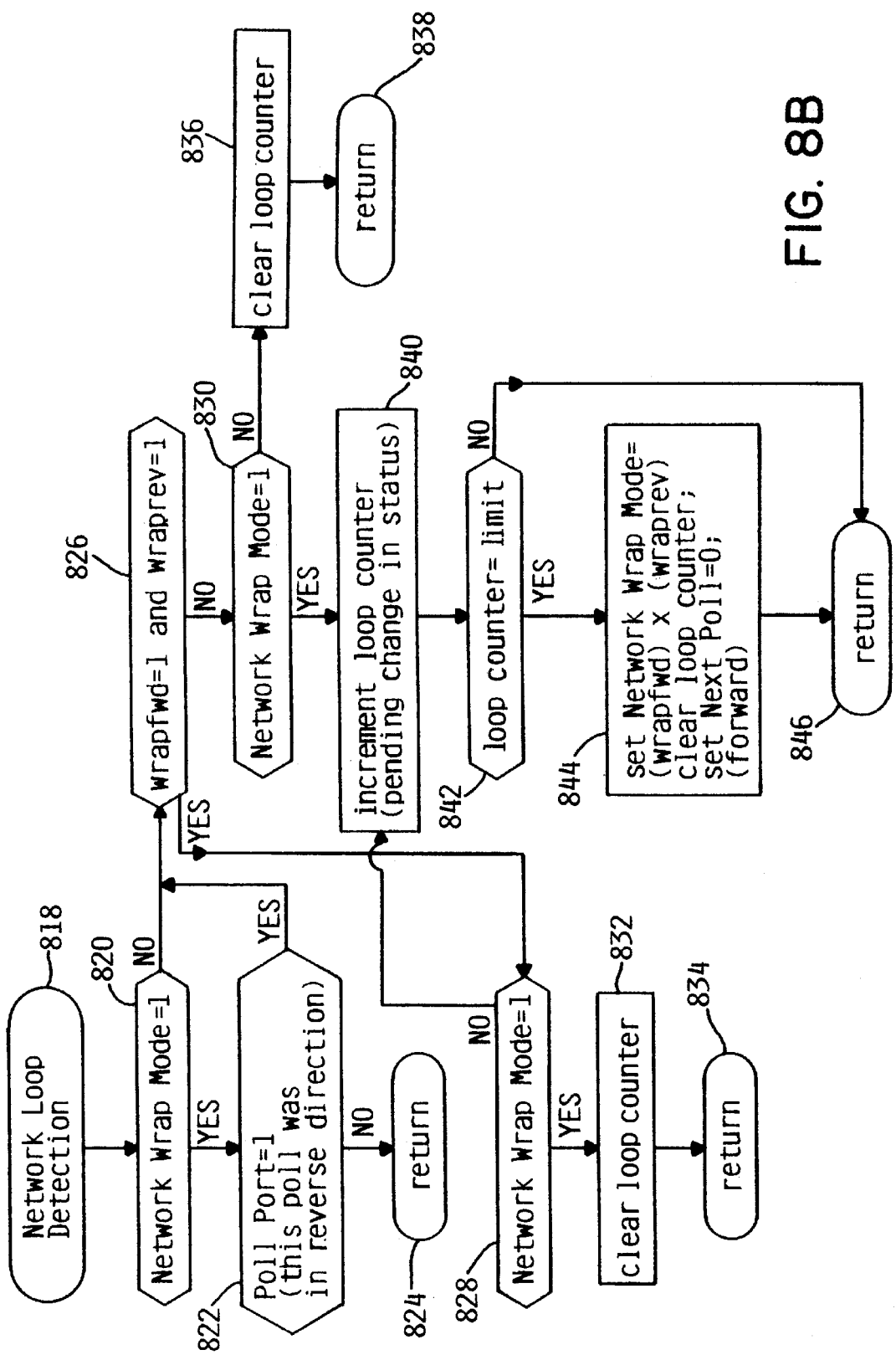

FIGS. 8A and 8B, which illustrate exemplary embodiments of a network poll routine and a network loop test routine, respectively, according to the invention, will now be described. Network Poll Pre-processing 802 in FIG. 8A is one component of the processing in Network Command Handler 502.

Network Loop Detection 818 in FIG. 8B is one component of the Network Response Handler. In step 802, the network poll pre-processing procedure is started. Next, in step 804, "Next Poll =0" determines whether this poll will be transmitted through port 0 or port 1. If the result is YES, the flow branches to step 806 where the flags "wrapfwd" and "wraprev" are cleared, the pointer "Configptr=BOC" is set, and the flag "Poll Port =0" is set. In other words, the wrap forward and wrap reverse flag values are cleared, the configuration pointer, which indicates a location in the network configuration table, is set to "BOC" which is the first rack/tower after the primary rack/tower, and the port to poll is set to port 0. The flags wrapfwd and wraprev are indications that the loop works in the forward and reverse directions, respectively. By convention, forward is in the direction from the primary node through port 0 of the primary node, and reverse is in the direction from the primary node through port 1.

Thereafter, it is determined whether the network wrap mode is set to 1 in step 808, i.e., loop mode, and if the result is YES, then in step 810, the Next Poll is set to 1, i.e., the next poll is set to be conducted in the reverse direction through port 1.

If the result of step 804 is NO, meaning that the poll will be through port 1, rather than port 0, then the flow branches from step 804 to step 812, where the configuration pointer is set to the last rack/tower in the network configuration table. Then in step 814, "Next Poll" is set to 0, i.e., the next polling is set to be conducted in the forward direction through port 0.

In step 816, the network poll command is built. The flow then proceeds to step 811, the poll port value is checked to see which port to direct the poll command to, i.e., port 0 or 1. If the port is port 0, i.e., the forward direction, then the flow proceeds to step 813, where the poll command is transmitted to the network through port 0, and the wrap pending flag on port 1 is set. This flag is used to indicate that the poll command arrival at the other port, port 1, is pending. If on the other hand, the poll is to be through port 1, in the reverse direction, the flow branches from step 811 to step 815, where the poll command is transmitted to the network through port 1, and the wrap pending flag for port 0 is set. The flow returns in step 817 completing the network pre-processing procedure.

In FIG. 8B, the network loop detection routine begins in step 818. This routine determines if the "state" of loop mode should be changed based on the results of several poll cycles. In step 820, it is determined whether network wrap mode is 1, i.e., loop mode. If the result of step 820 is YES, then the flow goes to step 822, where it is determined whether the poll port is set to 1, i.e., a reverse poll through port 1. If the result of step 822 is NO, then a poll has only been conducted in the forward direction and loop status cannot be analyzed until both a forward and a reverse poll have been completed. The flow therefore proceeds to step 824 to exit loop detection "return." If the result of step 820 is NO, then the network is not currently operating as a loop and every poll is issued to both ports.

In step 826, the wrapfwd and the wraprev flags are examined to determine if the current poll responses indicate that the network is connected as a loop.

In either case, the current loop status determined by the wrapfwd and wraprev flags is matched against the established loop status reflected by the state of Network Wrap Mode state in steps 828 and 830. This is for the purpose of detecting a change in loop status from open to closed, or vice versa. If no change is detected, then the loop counter is cleared in steps 832 and 836, and the loop detection routine is exited in steps 834 and 838, respectively.

If a change is detected in steps 828 or 830, then a loop counter is incremented in step 840. The loop counter is tested in step 842, and if the loop counter has not reached a limit value, the loop detection routine is exited at step 846. This is for the purpose of preventing spurious and intermittent network communication failures from erroneously changing the Network Wrap Mode.

When the loop counter reaches a limit value indicating that the current loop status has differed from the established value in the Network Wrap Mode for several cycles, the Network Wrap Mode is changed to reflect the new state as indicated by the values of wrapfwd and wraprev and shown in step 844.

In step 844, the network wrap mode is set to "(wrapfwd) x (wraprev)", that is, it is set to the logical AND of the two flags wrapfwd and wraprev. Then, the loop counter is cleared, and the next poll is set to 0, i.e., in the forward direction through port 0. Then the flow returns in step 846. If the test for loop mode fails, then one or both of the flags wrapfwd and wraprev will be 0, and the logical AND of these flags will therefore, also be 0, and thus the network wrap mode will be set to 0, i.e., open chains mode.

In the open chains mode, the network polling routine will poll through both ports in succession each polling cycle. In the loop mode, the polling routine will alternately poll through port 0 and port 1.

It will be apparent to one skilled in the art that the manner of making and using the claimed invention has been adequately disclosed in the above-written description of the preferred embodiments, taken together with the drawings.

It will be understood that the above description of the preferred embodiments of the present invention is susceptible to various modifications, changes, and adaptations, and the same are intended to be comprehended within the meaning and range of equivalents of the appended claims.

What is claimed is:

1. A communications network for carrying messages, comprising:

a communications medium;

a primary node coupled to the communications medium; and at least one secondary node coupled to the communications medium;

wherein each of the primary node and the at least one secondary node include first and second ports, the respective first and second ports being coupled to the communications medium so that the primary node and the at least one secondary node are connected in series;

wherein the at least one secondary node includes a processor and memory for storing an indication of the port at which an associated message was received at the node, so that:

if a message received at the at least one secondary node is a command addressed to that node, a response to the command is sent back to the primary node of the network on the port from which the command was received;

if a message received at the at least one secondary node is a broadcast command addressed to all secondary nodes, or is a command addressed to a different secondary node, the command is forwarded to the other nodes on the network on the respective other port from the port on which command was received; and if a message received at the at least one secondary node is a response from a different secondary node, the response is forwarded to the primary node of the network on the respective other port from the port on which the response was received.

2. The communications network according to claim 1, wherein when a garbled message has been received at a secondary node:

the garbled message is stopped from further propagation in the network by the secondary node at which the garbled message is received;

an error message is prepared by the node at which the garbled message is received, and the error message is sent to the primary node.

3. A communications network for carrying messages, comprising:

a communications medium;

a primary node coupled to the communications medium; and at least one secondary node coupled to the communications medium;

wherein each of the primary node and the at least one secondary node include first and second ports, the respective first and second ports being coupled to the communications medium so that the primary node and the at least one secondary node are connected in series;

wherein the at least one secondary node includes a processor and memory for storing an indication of the port at which an associated message was received at the node, so that:

if a message received at the at least one secondary node is a command addressed to that node, a response to the command is sent back to the primary node of the network on the port from which the command was received;

if a message received at the at least one secondary node is a broadcast command addressed to all secondary nodes, or is a command addressed to a different secondary node, the command is forwarded to the other nodes on the network on the respective other port from the port on which command was received; and if a message received at the at least one secondary node is a response from a different secondary node, the response is forwarded to the primary node of the network on the respective other port from the port on which the response was received;

and wherein the network further comprises a first timer and a second timer in the at least one secondary node processor;

wherein, when a command message has been successfully received at the secondary node, the first timer is started if the command message has a broadcast address, and the second timer is started if the command message has a specific node address;

wherein, when a response to a command message has been successfully received, if the first timer is running, then the first timer is restarted, or if the second timer is running, then the second timer is stopped; and wherein, when a garbled message has been received, the node receiving the garbled message checks whether either of the first or the second timers is running, and:

if either timer is running, the node determines that the garbled message is a response message, but if neither timer is running, the node determines that the garbled message is a command message;

the garbled message is stopped from further propagation in the network by the node at which the garbled message was received;

an error message is prepared by the node at which the garbled message was received, and the error message is sent to the primary node.

4. A communications network for carrying messages, comprising:

a communications medium;

a primary node coupled to the communications medium; and at least one secondary node coupled to the communications medium;

wherein each of the primary node and the at least one secondary node include first and second ports, the respective first and second ports being coupled to the communications medium so that the primary node and the at least one secondary node are connected in series;

wherein the at least one secondary node includes a processor and memory for storing an indication of the port at which an associated message was received at the node, so that:

if a message received at the at least one secondary node is a command addressed to that node, a response to the command is sent back to the primary node of the network on the port from which the command was received;

if a message received at the at least one secondary node is a broadcast command addressed to all secondary nodes, or is a command addressed to a different secondary node, the command is forwarded to the other nodes on the network on the respective other port from the port on which command was received; and if a message received at the at least one secondary node is a response from a different secondary node, the response is forwarded to the primary node of the network on the respective other port from the port on which the response was received;

wherein the primary node sends a network polling message to the network through the first port thereof, and the primary node subsequently sends a network polling message to the network through the second port thereof; and if the primary node receives at the second port at least a first byte of the polling message sent through the first port, and receives at the first port at least a first byte of the polling message sent through the second port, then the network is determined by the primary node to be operating in loop mode, but otherwise, the network is determined by the primary node to be operating as open chains.

5. The communications network according to claim 4, wherein if the network is operating in loop mode, the primary node implements a periodic poll cycle wherein the network is alternately polled in a first direction through the first port thereof, and then in a second direction through the second port thereof.

6. The communications network according to claim 5, wherein the primary node stores a configuration table during a first poll, and during subsequent polls, searches the table in the forward or reverse direction depending on the respective direction of the subsequent polls.

7. The communications network according to claim 4, wherein if the network is operating in loop mode, then address assignment and commands are directed through the network loop in only one direction from the primary node.

8. The communications network according to claim 4, wherein if the network is operating as open chains, the primary node implements a periodic poll cycle wherein on every polling cycle, a first chain is polled through the first port, and a second chain is polled through the second port.

9. The communications network according to claim 8, wherein the primary node stores a configuration table with configuration data for the first chain polled through the first port, followed by configuration data for the second chain polled through the second port.

10. The communications network according to claim 4, wherein after at least a first byte of the polling message sent by the primary node has been received back at the primary node on the respective port opposite from which it was sent, a flag is set and interrupts on the respective port are turned off so that the remainder of the polling message being received is ignored, thereby conserving processing power in the primary node.

11. A method of operating a communications network having a primary node and at least one secondary node, each node having first and second ports coupled to a communication medium, the method comprising:

receiving a message at the at least one secondary node at one of the first and second ports thereof;

storing in the secondary node which received the message an indication of the port at which the message was received;

if the message received was a command addressed to the secondary node which received the message, sending a response back to the primary node of the network on the port from which the command was received;

if the message received was a broadcast command addressed to all secondary nodes, or was a command addressed to a different secondary node than the secondary node which received the message, forwarding the command to the other nodes on network on the respective other port than the port on which it was received; and if the message received was a response from a different secondary node than the secondary node which received the message, forwarding the response to the primary node of the network on the respective other port than the port on which it was received.

12. The method according to claim 11, further comprising:

when a garbled message has been received at a secondary node, then:
stopping the garbled message from further propagation in the network by the secondary node at which the garbled message was received;
preparing an error message by the node at which the garbled message was received, and
sending the error message to the primary node.

13. A method of operating a communications network having a primary node and at least one secondary node, each node having first and second ports coupled to a communication medium, the method comprising:

receiving a message at the at least one secondary node at one of the first and second ports thereof;

storing in the secondary node which received the message an indication of the port at which the message was received;

if the message received was a command addressed to the secondary node which received the message, sending a response back to the primary node of the network on the port from which the command was received;

if the message received was a broadcast command addressed to all secondary nodes, or was a command addressed to a different secondary node than the secondary node which received the message, forwarding the command to the other nodes on network on the respective other port than the port on which it was received; and if the message received was a response from a different secondary node than the secondary node which received the message, forwarding the response to the primary node of the network on the respective other port than the port on which it was received;

providing a first timer and a second timer in the at least one secondary node;

starting the first timer when a command message has been successfully received at the at least one secondary node, if the command message has a broadcast address;

starting the second timer when a command message has been successfully received at the at least one secondary node, if the command message has a specific node address;

if the first timer is running when a response to a command message has been successfully received at the at least one secondary node, restarting the first timer;

if the second timer is running when a response to a command message has been successfully received at the at least one secondary node, then stopping the second timer; and when a garbled message has been received at the at least one secondary node:
checking whether either of the first or the second timers is running, and if either timer is running, determining that the garbled message was a response message, but if neither timer is running, determining that the garbled message was a command message;
stopping the garbled message from further propagation in the network;

preparing an error message; and sending the error message to the primary node.

14. A method of operating a communications network having a primary node and at least one secondary node, each node having first and second ports coupled to a communication medium, the method comprising:

receiving a message at the at least one secondary node at one of the first and second ports thereof;

storing in the secondary node which received the message an indication of the port at which the message was received;

if the message received was a command addressed to the secondary node which received the message, sending a response back to the primary node of the network on the port from which the command was received;

if the message received was a broadcast command addressed to all secondary nodes, or was a command addressed to a different secondary node than the secondary node which received the message, forwarding the command to the other nodes on network on the respective other port than the port on which it was received; and if the message received was a response from a different secondary node than the secondary node which received the message, forwarding the response to the primary node of the network on the respective other port than the port on which it was received;

sending a network polling message to the network from the primary node through the first port thereof, and subsequently sending a network polling message to the network from the primary node through the second port thereof; and if the primary node receives at the second port at least a first byte of the polling message sent through the first port, and receives at the first port at least a first byte of the polling message sent through the second port, then determining the network to be operating in loop mode, but otherwise, determining the network to be operating as open chains.

15. The method according to claim 14, wherein if the network is determined to be operating in loop mode, periodically polling the network with the primary node, wherein the network is alternately polled in a first direction through the first port of the primary node, and then in a second direction through the second port of the primary node.

16. The method according to claim 15, further comprising storing in the primary node a configuration table during a first poll, and during subsequent polls, searching the table in a forward or a reverse direction depending on the respective direction of the subsequent polls.

17. The method according to claim 14, wherein if the network is determined to be operating in loop mode, then directing address assignment and commands through the network loop in only one direction from the primary node.

18. The method according to claim 14, wherein if the network is determined to be operating as open chains, periodically polling the network with the primary node, wherein during every polling, a first chain is polled through the first port of the primary node, and a second chain is polled through the second port of the primary node.

19. The method according to claim 18, further comprising storing in the primary node a configuration table with configuration data for the first chain polled through the first port of the primary node, followed by configuration data for the second chain polled through the second port of the primary node.

20. The method according to claim 14, further comprising, after at least a first byte of the polling message sent by the primary node is received back at the primary node on the respective port opposite from which it was sent, setting a flag and disabling interrupts on the respective port so that the remainder of the polling message being received is ignored, thereby conserving processing power in the primary node.

* * * * *